June 19, 1923.
C. W. MORGAN
1,459,114
TESTING DEVICE FOR IGNITION SYSTEMS
Filed Oct. 9, 1919
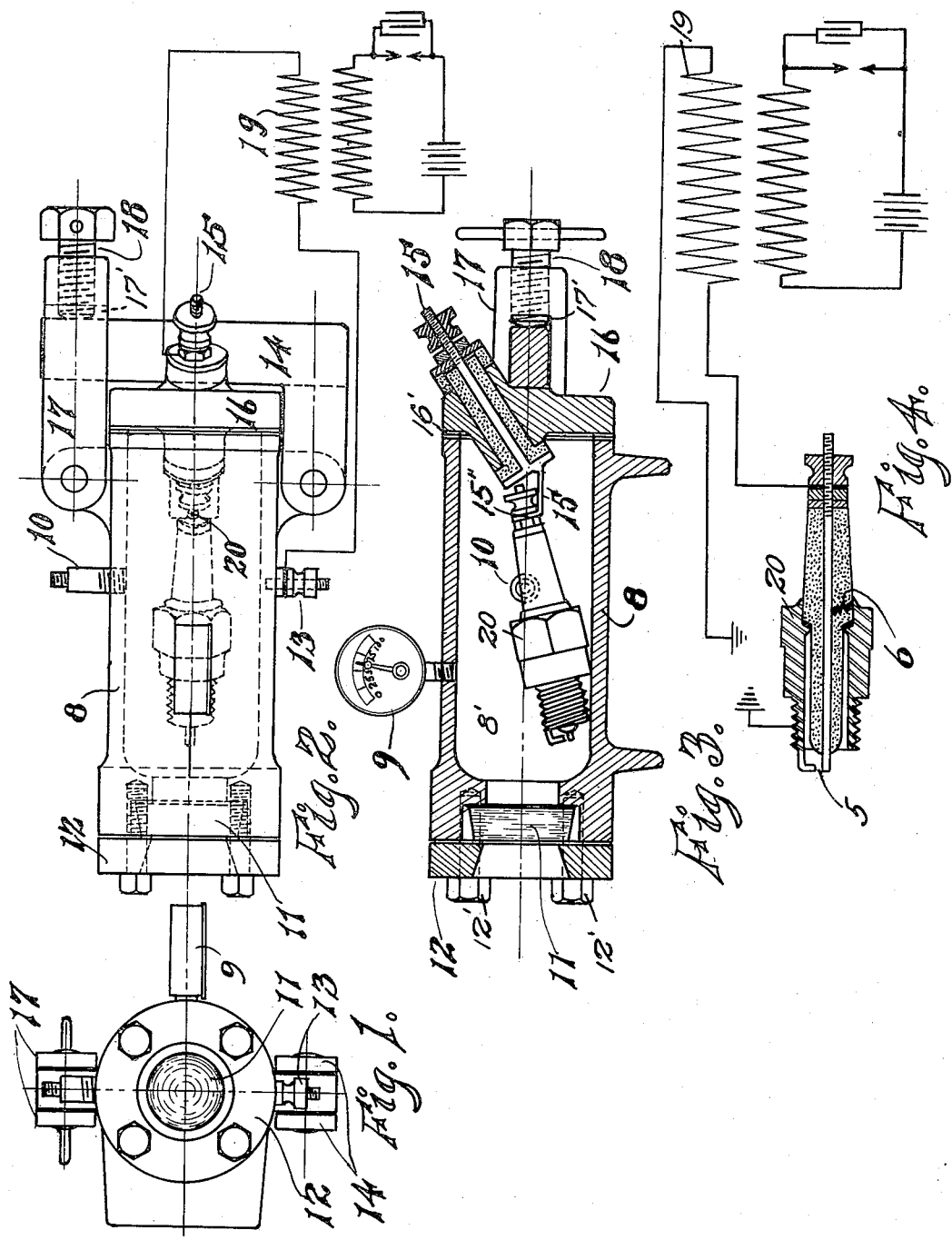
Witnesses:
H. O. B. Weber.
Arthur H. Seeley
Inventor:
Charles Woodward Morgan Patented June 19, 1923.

1,459,114

UNITED STATES PATENT OFFICE.

CHARLES WOODWARD MORGAN, OF CHICAGO, ILLINOIS.

TESTING DEVICE FOR IGNITION SYSTEMS.

Application filed October 9, 1919. Serial No. 329,502.

*To all whom it may concern:*

Be it known that I, CHARLES WOODWARD MORGAN, a citizen of the United States, residing at Chicago, in the county of Cook and State of Illinois, have invented certain new and useful Improvements in Testing Devices for Ignition Systems, of which the following is a specification.

This invention relates to testing devices for ignition systems of internal combustion engines and has for its primary object to provide a simple and efficient device for thoroughly testing the various parts of the system substantially under working conditions.

Another important object of the invention is to provide a testing device which may be used with all spark plugs irrespective of their size or shape.

Further objects of the invention are to provide a testing chamber which will maintain a constant gas pressure during a test, and to provide a closure for the testing chamber which may be easily and quickly opened and closed without injury to the gasket or other means employed to provide an air tight joint.

It is a well known fact that many imperfect spark plugs will apparently fire in a satisfactory manner at the gap when subjected merely to atmospheric pressure. If however the pressure of the air is increased at the spark gap, a pressure will be reached at which the high tension current from the source of electrical supply will seek a path through any break which may exist in the insulation of the plug or will follow a carbon deposit on the insulation in preference to bridging the spark gap. Therefore in order to ascertain whether or not a plug is defective, it is obviously necessary to test it under sufficient pressure to develop the existence of the defect.

Numerous forms of testing devices have been used and these have quite generally included a pressure chamber provided with observation window, a pressure gauge, and a perforation in one wall of the chamber to receive the sparking terminals of a spark plug. The spark plug forms the closure for this perforation. Spark plugs which have been used to any extent are rarely gas tight and also considerable difficulty is encountered in securing a tight joint between the plug and the wall of the pressure chamber. These sources of leakage cause the pressure in the testing chamber to fall during the test. Likewise spark plugs are of various sizes and shapes and will not fit the same diameter of perforation.

To obviate these difficulties I have provided a testing device in which the spark plug is placed entirely within the pressure chamber so that the size, shape or condition of the plug is immaterial. A permanent cap for the casing provides an air tight closure for the pressure chamber and maintains a constant pressure in this chamber throughout the test. The insulated electrode of the spark plug is connected to an exterior source of high voltage electrical current through the medium of an air tight insulated electrical conductor permanently set in the wall of the pressure chamber.

The many other features and advantages of my invention will be apparent as it is better understood by reference to the following specification in connection with the accompanying drawing disclosing a selected embodiment thereof in which:

Fig. 1 is an end elevation of my invention.

Fig. 2 is a top plan view with diagrammatical illustration of the electrical connections.

Fig. 3 is a central vertical section.

Fig. 4 is a diagrammatical view.

Referring to the drawings, a hollow metallic casing 8 is fitted with a pressure gauge 9 and a valved air inlet 10 communicating with the interior thereof. A transparent window 11 of any suitable material is held in place by a ring 12 secured to the open end of the casing 8 by means of bolts 12'. This window permits observation of the interior of the casing 8. A grounding terminal 13 is seated in the wall of the casing. The open end of the casing 8 opposite to the window 11 is provided with a cap 16 forming a closure therefor. One or more gaskets 16' of any suitable material are provided to form an air tight joint between the casing and this cap. I have found it advantageous to use two gaskets for this purpose, one being fitted to the cap and the other to the end of the cylindrical casing. An electrical conductor 15 passes through the cap and is insulated therefrom. The inner terminal of this conductor 15 is provided with an arm or extension 15' having an eyelet 15" or other suitable means formed on its outer extremity to engage the insulated terminal or electrode of a spark plug 20. The outer terminal of the conductor 15 is connected to a source 19 of high voltage electricity.

The cap 16 is tightly bound against the abutting end of the casing 8 by the interlocking yokes 14 and 17 which are pivotally mounted on opposite sides of the casing. The outer extremity of the yoke 14 enters the slot 17' in the yoke 17 and is engaged by the binding screw 18 entering this slot. The joints of the window, the pressure gauge, the air inlet valve, and the insulated conductor are made air tight by gaskets or other suitable form of packing. Air under pressure is supplied to the chamber 8' within the metallic casing through the valved inlet 10.

To utilize the device for the purpose of testing a spark plug, the cap 16 is removed by loosening the screw 18 and swinging outwardly the yokes 14 and 17. The insulated terminal of the spark plug is now connected to the arm 15' on the conductor 15 and the cap with the spark plug thereon replaced. The spark plug now rests wholly within the pressure chamber 8' and its metallic shell is in electrical contact with the metallic wall of the casing 8 which is electrically grounded by suitable connection with the grounding plug 13. In this construction the conductor 15 forms one electrode and the grounded metallic wall of the casing forms the other but it will be readily apparent that any means of providing positive and negative electrodes within the casing to connect with the corresponding parts of the spark plug therein might be substituted therefor.

The yokes 14 and 17 are swung into place and the screw 18 tightened to seal the chamber. Air pressure is admitted through the valved inlet 10 until the gauge 9 shows a pressure within the chamber 8' at least equal to that occurring in the cylinder of an internal combustion engine at the time of ignition. A high voltage current is then transmitted to the spark plug from the source 19 of electrical supply through the conductor 15. The sparking of the plug can be observed through the window 11. Various effects will be noted. If the insulator on the plug is covered with conducting material such as carbon, or if this insulator contains cracks or pinholes filled with such material, the spark plug will fail to fire or will fire in an erratic manner or fire across the carbon deposit and avoid the spark gap completely or partially. This is illustrated diagrammatically in Fig. 4 of the drawing in which a carbonized break or crack in the insulation is indicated at 6. The carbon or other electrically conductive material which has accumulated in this crack forms a second path for the high tension current. When the pressure of the air or gas in the chamber has been increased to that point where the resistance of the spark gap 5 is greater than the rather high resistance of the new path 6, the current will seek this path 6 in preference to the gap 5, thus causing the plug to fail to fire at all or fire erratically.

In utilizing the device forming the present invention for the purpose of testing a magneto, a spark plug in good condition should be installed in the pressure chamber on the arm 15' and pressure admitted to this chamber in the manner described. The magneto would be grounded to the casing in the proper manner and each secondary wire from the magneto would be connected in turn to the terminal 15. The quality of the spark for each connection can be observed through the window and any trouble located. Test of other parts of the ignition system such as coils, distributors, timers, wiring, etc., would be conducted in a similar manner as will be readily evident to any one skilled in the art.

In the selected embodiment of the invention described, the cap or closure 16 for the casing 8 is brought against the end of the casing by a straight forward motion and is then clamped in position by the yokes in the manner described. This form of cap and the method of its application to the casing is advantageous as it obviates any liability of injury to the gaskets but it will be readily appreciated that any other suitable form of cap and method of application may be substituted therefor.

I am aware that many changes in construction and in arrangement of parts may be made without departing from the invention and I reserve the right to make all such changes as fairly fall within the scope of the following claims.

I claim:—

1. A testing device for ignition systems comprising a testing chamber to receive and enclose a spark plug in its entirety, means for admitting gas under pressure to said chamber while said spark plug is therein, a circuit in which said spark plug is included, and a transparent window in a wall of said chamber to permit a view of the interior of the chamber.

2. A testing device for ignition systems comprising a chamber adapted to receive and wholly enclose a spark plug and having an opening in a wall thereof through which the spark plug is inserted and removed, a gas tight closure for said opening, means for admitting gas under pressure to said chamber while the spark plug is therein, an electric circuit, and means for including said spark plug in said circuit.

3. A testing device for ignition systems comprising a chamber adapted to receive and wholly enclose a spark plug and having an opening in a wall thereof through which the spark plug is inserted and removed, a closure for said opening, means for admitting gas under pressure to said chamber, a pressure gauge communicating with said chamber while the spark plug is therein, an electric circuit, and means for including said spark plug in said circuit, a portion of the walls of said chamber being transparent to permit a view of the interior of said chamber.

4. A testing device for ignition systems comprising a chamber adapted to receive and wholly enclose a spark plug and having electrically grounded metallic walls, said spark plug having one electrode contacting with a wall of said chamber, means for admitting gas under pressure to said chamber, an electric conductor passing through and insulated from a wall of said chamber and contacting with the other of said spark plug electrodes, and an electric circuit including said spark plug and electrodes.

5. A testing device for ignition systems comprising a chamber adapted to receive and wholly enclose a spark plug and having electrically grounded metallic walls and an opening in one wall through which the spark plug is inserted and removed, said spark plug having one conductor contacting with a wall of said chamber, a gas tight closure for said opening, means for admitting gas under pressure to said chamber, an electric conductor passing through and contacting with the other electrode of said spark plug, and a transparent window in one wall of said chamber to permit a view of the interior of said chamber.

6. A testing device for ignition systems comprising a hollow metallic cylinder open at its ends and adapted to receive and wholly enclose a spark plug, a transparent closure for the opening at one end of said cylinder, a cap forming a closure for the other end of said cylinder, means for admitting gas under pressure to the chamber within said cylinder, a pressure gauge communicating with said chamber, an electric circuit, and means for including said spark plug in said circuit.

7. A testing device for ignition systems comprising a chamber provided with an opening in the walls thereof to admit a spark plug within said chamber, a closure for said opening, means for clamping said closure over said opening, means for admitting gas under pressure into said chamber, and means for conducting a current of electricity to and from the electrodes of said spark plug while said plug is completely immersed in gas under pressure in said chamber.

8. A testing device for ignition systems comprising a chamber adapted to receive and wholly enclose a spark plug and having an opening in one wall thereof, a cap fitting over and forming a gas tight closure for said opening, means for securing said cap in place, means for admitting gas under pressure to said chamber, an electric circuit, and a positive and a negative electrode in said circuit in electrical contact with the corresponding electrodes of said spark plug.

9. A testing device for ignition systems comprising a casing having a chamber formed therein to receive and enclose a spark plug in its entirety, means for admitting gas under pressure to said chamber, an electrically grounded spark plug in said casing, and an insulated conductor entering said chamber and connected to a source of electrical supply and with the insulated terminal of said grounded spark plug.

10. The herein described means of testing a spark plug, comprising the combination of a hollow metallic chamber, a transparent window to permit a view of the interior of the chamber, a valve through which air or other gas may be admitted to the interior of the chamber, a gauge to determine the pressure of the air or other gas contained in the chamber, a removable cap permitting access to the interior of the chamber, members arranged to press the cap firmly in position, gaskets to seal the joint between the chamber and the cap, and an electrical conductor insulated from the cap and chamber, the conductor connecting the insulated electrode of the spark plug being tested within the chamber with an exterior source of high voltage electrical current, the source of electrical current being also grounded to the spark plug.

11. A testing device for ignition systems comprising a chamber adapted to receive and wholly enclose a spark plug, means for producing pressure in said chamber while said spark plug is therein, an electric circuit, and means for including the electrodes of said spark plug in said electric circuit.

12. A testing device for ignition systems comprising a chamber having a wall adapted to form a terminal, said chamber being adapted to receive and wholly enclose a spark plug with one electrode of the spark plug in electric contact with said wall of the chamber, an electric circuit, a terminal in said circuit and projecting into said chamber and having electric connection with the other electrode of said spark plug, and means for admitting pressure to said chamber.

October 7, 1919.

CHARLES WOODWARD MORGAN.

Witnesses:
  WILLIAM J. RYAN,
  H. B. WEBER.